(12) United States Patent
Heckel et al.

(10) Patent No.: US 11,541,465 B2
(45) Date of Patent: Jan. 3, 2023

(54) CUTTING TOOL COMPRISING AN ADJUSTING DEVICE

(71) Applicant: Guehring KG, Albstadt (DE)

(72) Inventors: Gerd Heckel, Puschendorf (DE); Hans-Peter Hollfelder, Fuerth (DE); Juergen Thanner, Hilpoltstein (DE)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 16/751,710

(22) Filed: Jan. 24, 2020

(65) Prior Publication Data

US 2020/0261984 A1 Aug. 20, 2020

Related U.S. Application Data

(63) Continuation of application No. PCT/EP2018/070400, filed on Jul. 27, 2018.

(30) Foreign Application Priority Data

Jul. 28, 2017 (DE) ..................... 10 2017 213 063.6

(51) Int. Cl.
  *B23B 29/034* (2006.01)
(52) U.S. Cl.
  CPC .. *B23B 29/03417* (2013.01); *B23B 2260/056* (2013.01)
(58) Field of Classification Search
  CPC ........ B23B 29/03414; B23B 29/03417; B23B 29/03446; B23B 29/03457;
  (Continued)

(56) References Cited

U.S. PATENT DOCUMENTS 2,263,085 A * 11/1941 Guild ................... B23B 29/034
                                                                    408/154
2,793,547 A *  5/1957 Benjamin ......... B23B 29/03407
                                                                    408/153
(Continued)

FOREIGN PATENT DOCUMENTS

CH         341698 A  * 10/1959   ....... B23B 29/03417
CH         369004 A  *  4/1963   ....... B23B 29/03407
(Continued)

OTHER PUBLICATIONS

Description DE102005028366A1 (translation) obtained at https://worldwide.espacenet.com/ (last visited Jun. 3, 2021).*
(Continued)

*Primary Examiner* — Ryan Rufo
(74) *Attorney, Agent, or Firm* — Burr & Brown, PLLC

(57) ABSTRACT

The invention relates to a cutting tool comprising a main part that can be rotationally driven about a rotational axis, at least one cutting insert holder mounted on the main part such that it can be radially adjusted, and an adjusting device for adjusting the position of the cutting insert holder relative to the main part. The cutting insert holder is mounted in a guide recess in the main part such that it can be moved transversely, preferably radially, to the rotational axis, and the adjusting device has an adjusting element that is arranged such that it can be moved inside the main part transversely to the rotational axis and transversely to the displacement direction of the cutting insert holder and supports the cutting insert holder.

13 Claims, 6 Drawing Sheets

(58) Field of Classification Search
CPC ........ B23B 29/03407; B23B 29/03428; B23B 29/03403; B23B 29/034; B23B 2229/12
See application file for complete search history.

(56) References Cited

U.S. PATENT DOCUMENTS

| | | | |
|---|---|---|---|
| 2,874,597 A | 2/1959 | Bach | |
| 3,144,792 A * | 8/1964 | Marchis | B23B 29/03414 408/181 |
| 3,324,529 A | 6/1967 | McCreery | |
| 3,738,767 A * | 6/1973 | Benjamin | B23B 29/03417 408/161 |
| 3,801,213 A * | 4/1974 | Eversole | B23B 29/03407 408/181 |
| 3,853,422 A * | 12/1974 | Benjamin | B23B 29/03417 408/161 |
| 4,043,696 A | 8/1977 | Wohlhaupter | |
| 4,289,431 A | 9/1981 | Berstein | |
| 4,428,704 A | 1/1984 | Kalokhe | |
| 4,793,748 A * | 12/1988 | Santi | B23B 29/03446 407/45 |
| 5,396,693 A * | 3/1995 | Lohner | B23B 29/0341 29/527.1 |
| 6,394,710 B1 | 5/2002 | Kurz | |
| 7,699,567 B2 * | 4/2010 | Nedzlek | B23D 43/04 408/158 |
| 2003/0002938 A1* | 1/2003 | Maar | B23B 29/03453 408/168 |
| 2004/0028489 A1 | 2/2004 | Brock et al. | |
| 2004/0136794 A1 | 7/2004 | Giorda | |
| 2007/0084320 A1 | 4/2007 | Frank et al. | |
| 2010/0061819 A1* | 3/2010 | Frank | B23B 29/03414 408/143 |
| 2011/0058910 A1 | 3/2011 | Nedzlek | |
| 2013/0315683 A1* | 11/2013 | Johne | B23B 29/03417 408/16 |
| 2016/0114402 A1 | 4/2016 | Chen | |
| 2016/0368063 A1 | 12/2016 | Teranishi | |
| 2017/0014916 A1 | 1/2017 | Gehlsen | |

FOREIGN PATENT DOCUMENTS

| | | | |
|---|---|---|---|
| DE | 853087 C * | 10/1952 | ....... B23B 29/03446 |
| DE | 24 05 694 A1 | 8/1975 | |
| DE | 24 60 028 | 3/1976 | |
| DE | 27 23 622 A1 | 11/1978 | |
| DE | 40 22 579 A1 | 1/1991 | |
| DE | 196 49 143 A1 | 6/1997 | |
| DE | 19944851 A1 * | 6/2001 | ....... B23B 29/03407 |
| DE | 100 52 376 A1 | 5/2002 | |
| DE | 10 2004 052 211 | 4/2006 | |
| DE | 10 2005 028 366 A1 | 12/2006 | |
| DE | 102005028366 A1 * | 12/2006 | ....... B23B 29/03478 |
| DE | 10 2016 217 243 A1 | 3/2018 | |
| EP | 0016744 A1 * | 10/1980 | ........... B23B 29/034 |
| EP | 1 402 979 | 6/2005 | |
| EP | 1 767 295 A2 | 3/2007 | |
| FR | 1100125 A * | 9/1955 | ....... B23B 29/03407 |
| GB | 191114666 A * | 12/1911 | ....... B23B 29/03417 |
| GB | 559442 A * | 2/1944 | ......... B23B 29/0341 |
| GB | 982783 A * | 2/1965 | ......... B23B 29/0341 |
| JP | 2011-194482 A | 10/2011 | |
| WO | 98/48964 A1 | 11/1998 | |
| WO | WO-0204157 A1 * | 1/2002 | ....... B23B 29/03417 |
| WO | 2004/012887 A2 | 2/2004 | |
| WO | 2009/005804 A1 | 1/2009 | |
| WO | 2010/021284 A1 | 2/2010 | |
| WO | WO-2013002506 A2 * | 1/2013 | ....... B23B 29/03417 |

OTHER PUBLICATIONS

International Search Report and Written Opinion of the International Searching Authority (and English translation) from a corresponding International patent application (PCT/EP2018/070400) dated Nov. 19, 2018, 17 pages.

DPMAregister from a corresponding German patent application (DE 10/2017 213 063.6 printed on Feb. 12, 2020, 2 pages.

International Preliminary Report on Patentability from a corresponding International patent application (PCT/EP2018/070400) dated Jan. 28, 2020, 7 pages.

* cited by examiner

CUTTING TOOL COMPRISING AN ADJUSTING DEVICE

The invention relates to a cutting tool according to the preamble of claim 1.

A cutting tool of this type is known, for example, from DE 100 52 376 A1. The cutting tool shown in the publication has a main part (ground holder), which can be driven about a rotational axis, and a machine tool-side interface, which extends the main part and comprises a HSK (hollow taper shank) shank. In one embodiment of the cutting tool, a cutting insert holder (tool holder), which is equipped with a cutting plate (tool), is mounted on the main part in a receiving pocket, which is open on the outer circumferential side, while in another embodiment, two cutting insert holders, which are each equipped with a cutting plate, are each mounted axially offset on the main part in a receiving pocket, which is open on the outer circumferential side. To compensate for a cutting insert wear, each cutting insert holder can be radially set. A setting device provided for this purpose is formed of a setting rod (setting mandrel), which is arranged in the main part such that it can be longitudinally moved, and of a setting element (pressure element), which is supported with a first end on a control surface on the setting rod and with its second end on the cutting insert holder. In the case of an axial movement of the setting rod, which is prompted by means of a setting screw that can be actuated on the front side, the cutting insert holder is or the cutting insert holders are displaced radially to the outside via a wedge surface drive formed by the assigned control surface of the setting rod and the respective setting element.

Further cutting tools, which are based on a similar operating principle, comprising one or several cutting insert holders are known, for example, from DE 40 22 579 A1, WO 2004/012887 A2, EP 1 402 979 B1, WO 98/48964 A1, WO 2009/005804 A1, DE 24 05 694 A1 or WO 2010/021284 A1.

In the case of the above-specified cutting tools, the cutting insert holders for fine setting of the cutting inserts or for compensation of a cutting insert wear can be set relative to the main part either by means of an elastic deformation (see, e.g., DE 100 52 376 A1, EP 1 402 979 B1, WO 2009/005804 A1, and DE 24 05 694 A) or by means of a pivoting (see DE 40 22 579 A1, WO 2004/012887 A2, WO 98/48964 A1, and WO 2010/021284 A1). For this purpose, the cutting insert holders are radially controlled via a setting rod, which is arranged in the main part of the cutting tool such that it can be axially moved, and a setting element, which is arranged in the main part between a wedge surface on the setting rod and the cutting insert holder such that it can be radially moved.

A multi-point cutting tool (drill rod) is described in DE 10 2004 052 211 A1 and in DE 10 2005 028 366 A1, which provides for an individual resetting of each of the several cutting inserts via a setting rod (pull rod). For this purpose, it is proposed concretely to individually connect a setting device of each of a plurality of cutting insert holders (clamping holders) to the setting rod via a coupling device. Due to the coupling devices arranged between the setting devices of the cutting insert holders and the central setting rod, an individual cutting insert resetting is made possible in order to compensate for a cutting insert wear.

An adjusting device is further known from DE 196 49 143 A1, which provides for an individual setting of a cutting insert holder relative to a main part of a cutting tool for compensating a cutting insert wear. The adjusting device of DE 196 49 143 A1 is arranged in the main part (shank) of the cutting tool (drill rod) and is formed of a differential screw and a threaded sleeve. By rotating the differential screw, the threaded sleeve is moved, whereby the cutting insert holder, in turn, is set in height by lowering or raising its front portion, which is pivotably mounted in the axial direction.

A cutting tool comprising a cutting insert holder (cartridge), which is arranged in a receiving pocket (recess), which is open on the outer circumferential side, and which is divided by a slot into a bridge (bight portion) and two legs, one leg of which is tightly screw-connected to a main part (boring bar) and the other leg supports a cutting plate and can be radially set relative to the one leg by means of an elastic deformation, is known further from U.S. Pat. No. 4,428,704. The adjusting device arranged inside the cutting insert holder for this purpose, which has a differential screw, acts between the legs, which can be deformed relative to one another, of the cutting insert holder part. The tight screw-connection of the cutting insert holder, however, prevents a radial setting of the entire cutting insert holder relative to the main part.

In the case of the solutions known from the prior art, the setting of the cutting inserts of the respective cutting insert holders thus takes place via an elastic deformation or a pivoting, respectively, of the cutting insert holder, which extends in the longitudinal direction of the cutting tool. However, the expansion of the cutting insert holder in the axial direction, which is required for the elastic deformation or for the pivoting, respectively, limits the number of the cutting insert holders, which can be provided on the cutting tool in the axial direction. The setting of the cutting inserts by means of elastic deformation or pivoting, respectively, or of the contact point of the cutting inserts, respectively, is imprecise by nature.

Based on the above-discussed prior art, the invention is thus based on the object of providing a cutting tool comprising a main part, which can be rotationally driven about a rotational axis, at least one cutting insert holder, which can be radially set on the main part, and a setting device for setting the position of the cutting insert holder relative to the main part, which provides for a precise setting of the cutting insert or of the cutting element, respectively, of the cutting insert holder, respectively, wherein the cutting insert holder is constructed in a compact manner and, together with the setting device, requires little installation space in the axial direction of the cutting tool.

This object is solved by means of a cutting tool comprising the features of claim 1. Advantageous or preferred further developments are in each case the subject matter of dependent claims.

A cutting tool according to the invention is preferably used for bore finishing or bore fine-machining, in particular of a so-called bearing tunnel. Tools of this type are used, for example, in the automobile industry in order to machine bores of several bearing webs arranged in series of a bearing tunnel for mounting a shaft, for example a crankshaft or camshaft, to a final diameter dimension. Specifically in this case, the cutting tool is preferably formed with multiple points, so as to be able to synchronously machine several bearing webs of a bearing tunnel, so that several cutting insert holders are arranged on the main part of the cutting tool at the distances corresponding to the axial distances of the bearing webs, preferably in a row.

The cutting tool according to the invention has a main part, which can be rotationally driven about a rotational axis, at least one cutting insert holder arranged on the main part such that it can be radially set, and a setting device for setting the position of the cutting insert holder in relation to the main part. The cutting insert holder is arranged in a guide recess in the main part such that it can be moved transversely, preferably radially, to the rotational axis of the main part. The setting device has a setting element, which can be set inside the main part transversely (perpendicular) to the rotational axis of the main part as well as transversely (perpendicular) to the direction of movement of the cutting insert holder, and supports the cutting insert holder.

A precise setting and displacement of the cutting element with respect to the main part and a workpiece, which is to be machined, can be attained due to the in particular radial movability of the cutting insert holder and thus of the cutting insert (cutting element) arranged thereon, in particular a more precise setting than in the case of a displacement of the cutting insert holder by pivoting or elastic deformation, as it is known from the prior art. It goes without saying that a cutting insert holder can comprise several cutting inserts (cutting elements).

In particular for machining several bearing webs of a bearing tunnel, the cutting tool according to the invention can have cutting insert holders, which are each arranged in a corresponding guide recess in the main part such that they can be moved transversely, preferably radially, to the rotational axis, and are supported on a setting element assigned to the respective cutting insert holder. This means that a setting device comprising a setting element is assigned to each cutting insert holder, so that the cutting insert holders can be set individually, wherein the setting element can be set perpendicular to the rotational axis of the main part and perpendicular to the direction of movement of the cutting insert holder. The cutting insert holders can thereby be arranged at identical or different distances to the rotational axis of the main part such that the position can be set. The distances between the cutting insert holders can also be even or variable in the longitudinal direction of the cutting tool.

The or the respective cutting insert holder, respectively, is preferably received in a positive manner in the guide recess of the main part assigned to it. The respective cutting insert holder is furthermore preferably received in the guide recess so as to be secured against rotation and can be formed as drill bit, which is inserted into the guide recess. The guide recess thereby extends perpendicular to the rotational axis of the main part of the cutting tool according to the invention and in the direction of movement of the cutting insert holder.

According to a preferred embodiment, the guide recess is formed as through recess, in particular as through bore. In this case, the cutting insert holder preferably has an aperture, which extends transversely (perpendicular) to the rotational axis of the main part and transversely (perpendicular) to the direction of movement of the cutting insert holder, for receiving the setting element of the setting device assigned to the cutting insert holder. Receiving openings (also referred to as notches or receptacles) for receiving the setting device or the ends/end regions thereof, respectively, are provided in the wall of the main part surrounding the guide recess.

According to an alternative embodiment, the guide recess is formed as ground recess, i.e. as recess comprising a ground or bottom, respectively, in particular as blind hole, wherein the ground of the ground recess is provided on the end of the ground recess opposite the cutting insert of the cutting insert holder. In this case, the setting element of the setting device is preferably arranged between the ground/bottom of the ground recess and the cutting insert holder. In the case of this embodiment, the wall of the main part surrounding the ground recess also has corresponding receiving openings for receiving the setting device.

At least one cutting element, which protrudes radially to the outside, can be provided on the cutting insert holder. The cutting element is in particular a cutting plate comprising a cutting insert, preferably a reversible cutting plate. The cutting element can be received in the seat provided on the cutting insert holder such that the position can be set, e.g. by means of screw-connection, clamping, etc., or such that it is positionally fixed, e.g. by means of adhering or soldering.

The cutting insert holder is preferably supported elastically, preferably in a spring-loaded manner, in relation to the main part, so that it can be moved perpendicular to the rotational axis of the main part. For this purpose, the cutting insert holder according to the preferred embodiment is connected to a traverse, which is supported against the main part via one or several compression springs, wherein the compression springs extend in the direction of movement of the cutting insert holder. The traverse, in turn, extends perpendicular to the direction of movement of the cutting insert holder, preferably parallel to the rotational axis of the main part.

The setting device of the cutting tool according to the invention preferably has a threaded drive for driving the setting element of the setting device. According to a preferred design, the setting element is formed of a threaded sleeve, which has a control slope, on which the cutting insert holder is supported. The threaded sleeve can be moved in its axial direction, i.e. transversely (perpendicular) to the rotational axis of the main part and transversely (perpendicular) to the direction of movement of the cutting insert holder. The threaded drive has a drive spindle, which is mounted on the main part and is screw-connected to the threaded sleeve. The threaded drive preferably further has a threaded bushing (also referred to as bearing bushing), which is secured in the main part spaced apart from the threaded sleeve. The threaded bushing is arranged in a stationary manner in the main part. In particular for production-related reasons, the threaded bushing instead of a threaded bore is provided in the main part surrounding the cutting insert holder.

The drive spindle is preferably formed as differential threaded spindle, which is screw-connected with a first threaded portion to the threaded sleeve and with a second threaded portion to the threaded bushing. Threaded sleeve and threaded bushing are screwed onto the differential threaded spindle. The first threaded portion and the second threaded portion can have different thread pitches (leads), but identical thread directions (lead directions). In response to an actuation of the differential threaded spindle, the threaded sleeve moves in the direction of the spindle axis, i.e. perpendicular to the rotational axis of the main part and perpendicular to the direction of movement of the cutting insert holder by a distance, which corresponds to the difference in pitch of the two threaded portions of the differential threaded spindle. A compression spring can be provided between the threaded sleeve and the threaded bushing, so as to reduce a thread play between the external thread of the first threaded portion of the differential threaded spindle and the internal thread of the threaded sleeve on the one hand, and a thread play between the external thread of the second threaded portion of the differential threaded spindle and the internal thread of the threaded bushing on the other hand.

Drive spindle, threaded sleeve, and threaded bushing extend perpendicular to the rotational axis of the main part and perpendicular to the direction of movement of the cutting insert holder. In the case of the embodiment, in which the guide recess for the cutting insert holder is formed as through recess, the drive spindle and the threaded sleeve extend through the aperture provided in the cutting insert holder, which can in particular have an essentially square or rectangular cross section.

An actuating element, which is held on the main part such that it can be rotationally moved and which engages with the drive spindle or the differential threaded spindle, respectively, in a rotationally fixed manner and in particular in an axially movable manner, and which serves for the rotational actuation of the drive spindle or of the differential threaded spindle, respectively, is preferably assigned to the or each setting device, respectively, of the cutting tool according to the invention. The actuating element preferably comprises a so-called scale ring, which has, for example, a scaling of 10 marks/graduation marks, so that a setting accuracy of 0.001 mm can be realized precisely in the semidiameter. The actuating element or the scale ring thereof, respectively, is preferably fastened to the main part of the cutting tool according to the invention by means of a spring ring and simultaneously represents the longitudinal coupling of the drive spindle or of the differential threaded spindle, respectively.

By means of the setting device of the cutting tool according to the invention, the cutting insert holder can be radially set between a position controlled to the inside, in which the cutting element held on the cutting insert holder lies at a minimal diameter relative to a rotational or longitudinal central axis of the main part, in the radial direction for example at a defined (small) distance outside of (for example a distance of 0.2 mm), at the height or within the outer circumference of the main part, and a position controlled to the outside, in which the cutting element held on the cutting insert holder lies at a maximum radius, i.e. at a predetermined nominal diameter dimension relative to the rotational or longitudinal central axis of the main part, i.e. at a (large) radial distance (for example at a distance of 0.5 mm) above the outer circumference of the main part. A setting range of the cutting element held on the cutting insert holder of between 0.2 mm and 0.5 mm in the machining diameter can be attained, for example, with the help of the actuating element, which has a scale ring with 10 graduation marks on the circumference thereof, wherein the feed is between 0.002 mm and 0.005 in the machining diameter, and requires maximally 10 rotations of the scale ring. A continuous smaller and larger setting is thus possible in the mentioned setting range.

In addition to the setting device for the cutting insert holder of the cutting tool according to the invention, an adjusting device, which is integrated in the cutting insert holder and via which the position of the cutting insert holder relative to the setting element can be preset, for example in response to the production of the cutting tool, can be provided for adjusting the position of the cutting insert holder relative to the setting element of the setting device.

The adjusting device preferably has a setting member, which is preferably formed as setting screw, in particular as jack screw, and via which the cutting insert holder is supported on the setting element, in particular on the control slope of the threaded sleeve forming the setting element. The setting screw is arranged in a preferably slotted threaded bushing, the thread play of which can be set or displaced, respectively, by means of a threaded pin. To keep adjustment errors caused by contaminations or inaccuracies as low as possible, a point contact of the setting screw on the setting element, in particular the control slope thereof, is sought. A point contact is attained particularly easily by means of a round surface. For this purpose, the end of the setting member, which is preferably formed as setting screw and which is located opposite the control surface, can preferably be rounded.

Due to the fact that the setting device of the cutting tool according to the invention extends in the transverse direction to the rotational axis of the main part as well as in the transverse direction to the direction of movement of the cutting insert holder, an installation space-saving arrangement of the cutting insert holders in the axial direction, i.e. in the longitudinal direction, of the cutting tool is possible, so that a large number of cutting insert holders and thus a large number of cutting inserts/cutting elements can be provided in a small space (viewed in the axial direction or longitudinal direction, respectively) on the cutting tool. Due to the fact that different cutting inserts/cutting elements can typically be used for different machining steps (e.g. roughing, semi-finishing, finishing, providing with a bezel, etc.), cutting inserts for a large number of machining steps can be accommodated on a portion of relatively short axial expansion in the case of the cutting tool according to the invention, so that the cutting tool according to the invention has to be moved back and forth only over short distances in the longitudinal direction, for example in response to the machining of bearing points of a bearing tunnel in response to switching from one machine step to the next, and thus in response to switching from one cutting insert to another cutting insert, and only a single cutting tool according to the invention is advantageously required for machining a bearing tunnel. This means that no change has to be made between different cutting tools comprising cutting insert holders/cutting elements, which are formed for different machining steps.

Preferred embodiments of a cutting tool according to the invention will be described below with the help of the enclosed drawings, in which.

Figure 1:
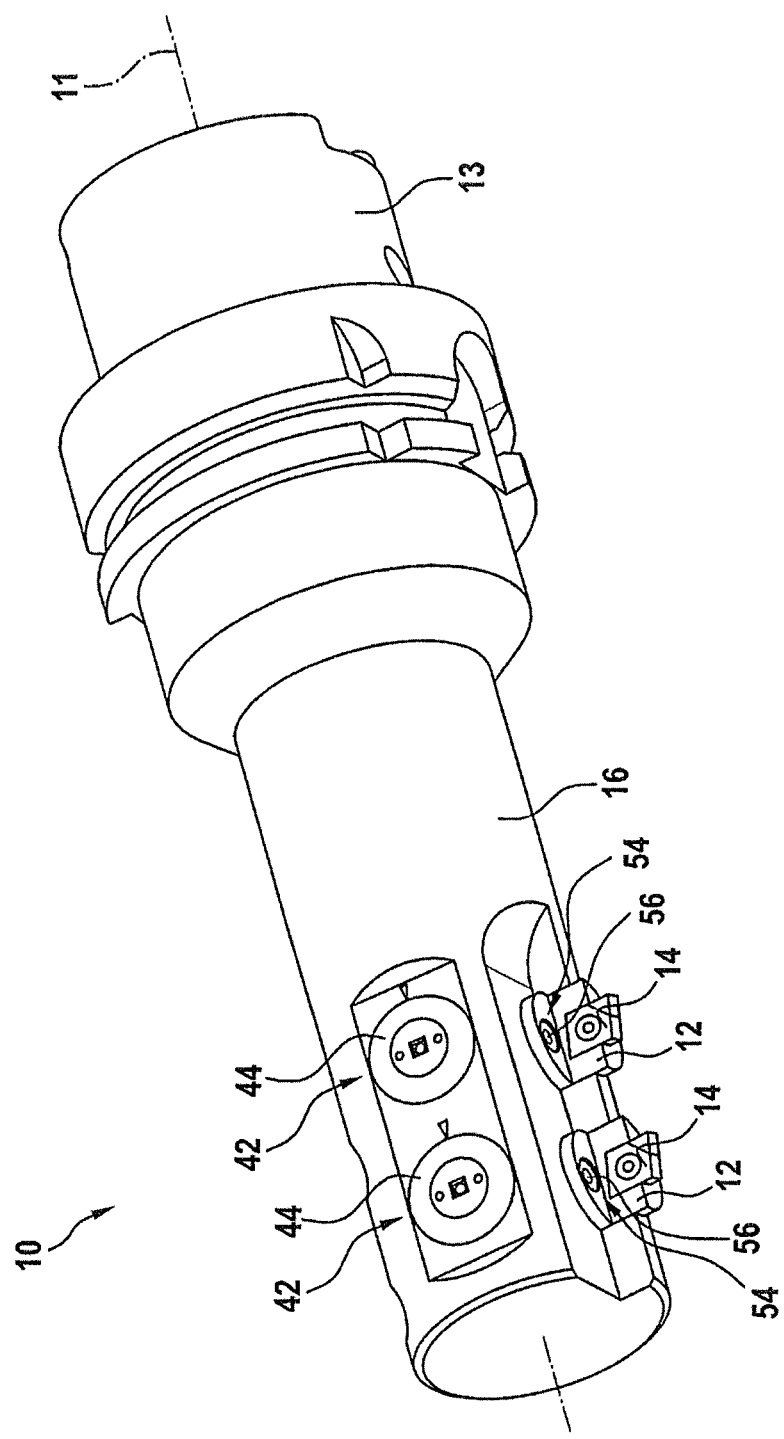
FIG. 1 shows a perspective view of the cutting tool according to the invention.
Figure 2:
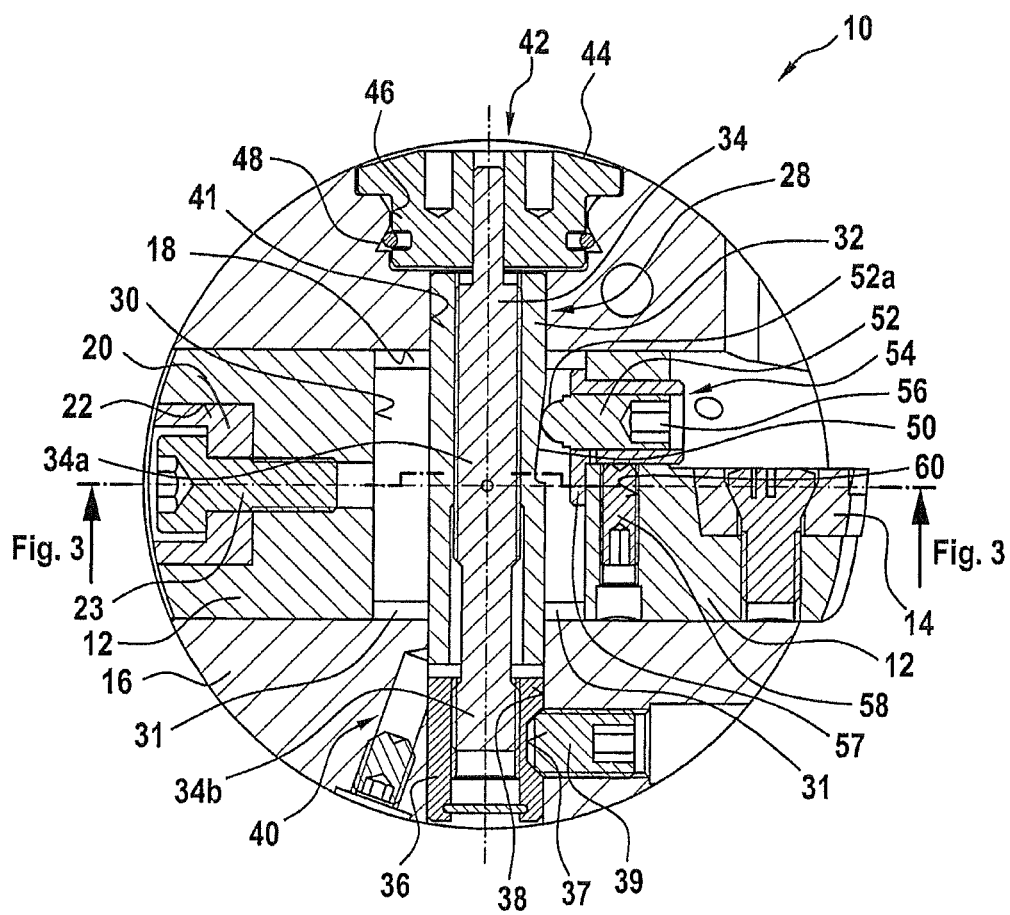
FIG. 2 shows a cross section of a cutting tool according to a first embodiment of the invention.
Figure 3:
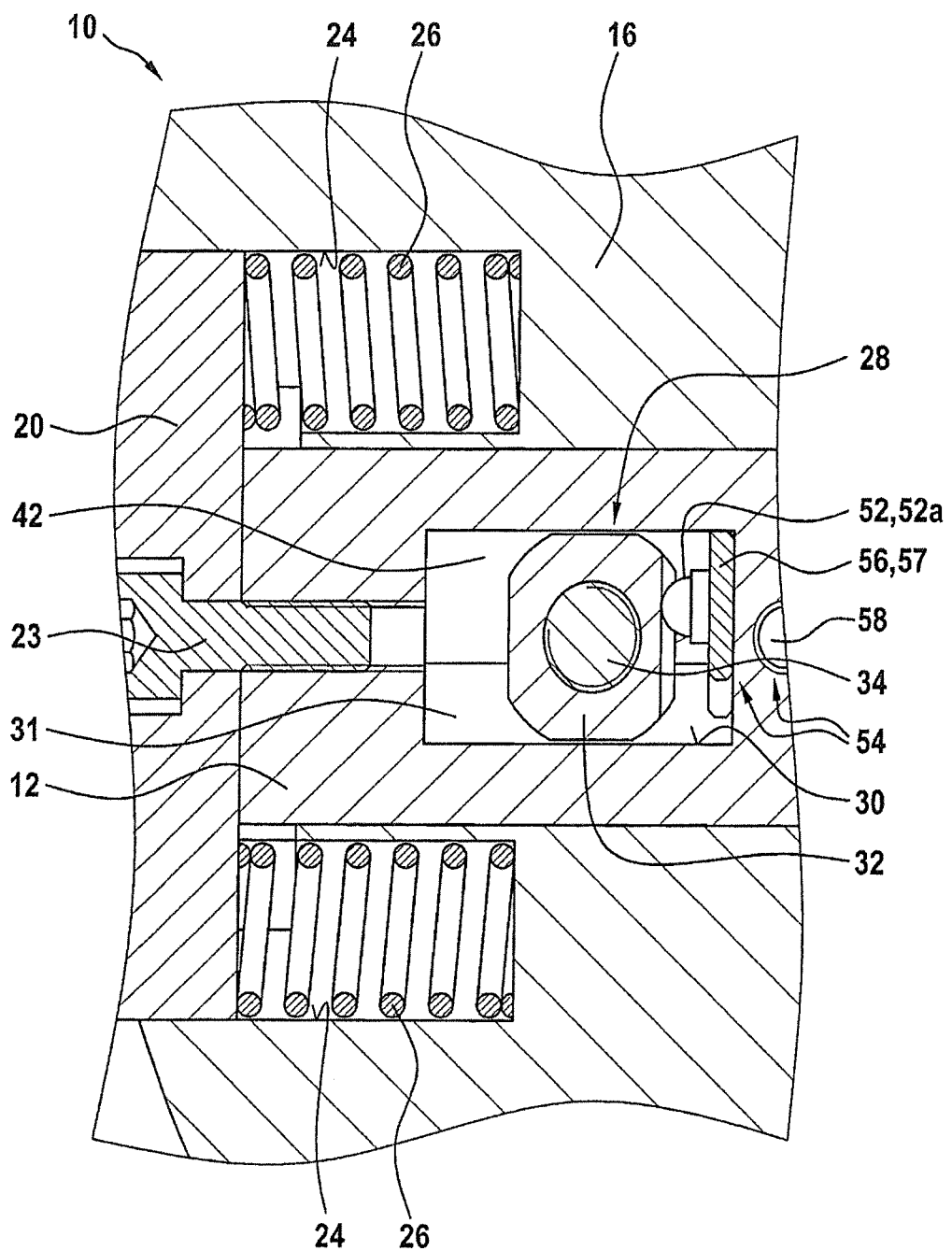
FIG. 3 shows a longitudinal section of the first embodiment of the invention shown in FIG. 2.

FIGS. 1 to 3 show a cutting tool 10 according to a first embodiment of the invention in the transverse and longitudinal section and in side view. The cutting tool 10 has at least one cutting insert holder 12 comprising a cutting element 14. The cutting element 14 can be formed by a cutting plate, in particular a reversible cutting plate. In the alternative, the cutting insert holder 12 can support for example a cutting attachment, a cutting strip, etc., instead of the cutting plate as cutting element. In any case, the cutting element 14 has at least one geometrically defined cutting insert for machining an assigned machining point, in particular a bearing point. The cutting tool 10 is preferably provided with a non-illustrated cooling system or coolant supply, respectively.

To machine several bearing points of a bearing tunnel (not illustrated), the cutting tool 10 preferably has several cutting insert holders 12 comprising cutting elements 14, which are arranged spaced apart, preferably in a row, in the axial direction or in the longitudinal direction, respectively, of the cutting tool 10, i.e. parallel to the rotational or longitudinal central axis, respectively, which is not identified in more detail, of the cutting tool 10. The cutting elements 14 can thereby be provided and designed for roughing, semi-finishing, finishing, and, if desired, for providing a workpiece with bezels. The axial distances, at which the cutting element 14 are arranged, correspond to the distances, at which the workpieces to be machined or workpiece regions, respectively, for example the bearing webs or a bearing tunnel, are arranged. A bearing tunnel of this type is located, for example, in a cylinder crankcase, which is to be machined, of an internal combustion engine. The cutting tool 10 according to the invention can thus be used as a bearing tunnel tool or generally as a bore finishing or bore fine-machining tool.

The cutting tool 10 according to the invention has a main part 16 (also referred to as tool shank), which can be rotationally driven about a rotational or longitudinal central axis, which is not identified in more detail (in FIG. 1: reference numeral 11) of the cutting tool 10, and which is formed in an exemplary manner as a drill rod in the shown embodiment. On its rear end, the main part 16 has a machine tool spindle-side interface 13, which has a so-called HSK (hollow taper shank) shank in the shown embodiment. In the alternative, a so-called SK (steep taper) shank or the like can be provided, for example.

The cutting insert holder 12 is received in a guide recess 18 provided in the main part 16, wherein the guide recess 18 extends perpendicular to the rotational axis of the main part 16 or of the cutting tool 10, respectively. The cutting insert holder 12 is arranged in the guide recess 18 such that it can be moved transversely, in particular radially, to the rotational axis of the main part 16. The cutting insert holder 12 and thus the guide recess 18 in particular have a circular cross section, but can, for example, also have a rectangular, in particular square cross section.

On its one end, the cutting insert holder 12 has a cutting element seat, which is not identified in more detail, for receiving the cutting element 14. On its other, opposite end, the cutting insert holder 12 is connected to a traverse 20, which extends perpendicular to the direction of extension of the cutting insert holder 12, preferably parallel to the rotational axis of the main part 16, and laterally over the cutting insert holder 12 into the main part 16, and which is mounted on the main part 16 in a spring-loaded manner. In particular in the case of a circular cross section of the cutting insert holder 12, the traverse 20 further forms an anti-rotation protection of the cutting insert holder 12 in the guide recess 18. This means that the cutting insert holder 12 is supported in a spring-loaded manner on the main part 16 via the traverse 20. To receive the traverse 20 in the cutting insert holder 12, a groove 22 can be provided in the cutting insert holder 12 on the end of the cutting insert holder 12 located opposite the cutting element 14. The traverse 20 is fastened to the cutting insert holder 12, for example by means of a screw 23, which is inserted into the groove 22, wherein the screw 23 can be actuated from outside the main part 16. On its side facing away from the cutting insert holder 12, the traverse 20 is preferably rounded, wherein the rounding radius corresponds to the radius of the main part 16. Notches 24 for receiving the ends of the traverse 20, which protrude laterally beyond the cutting insert holder 12, are provided in the wall for the main part 16 surrounding the guide recess 18.

For the spring-loaded support of the traverse 20 and thus of the cutting insert holder 12 on the main part 16, compression springs 26 are integrated in the notches 24 in the main part 16, which press onto the traverse 20, which extends transversely to the cutting insert holder 12 in the direction of movement of the cutting insert holder 12, in particular on the ends of the traverse 20, which protrude laterally beyond the cutting insert holder 12 and which are also received in the notches 24. A compression spring 26 is preferably assigned to each end of the traverse 20. The notches 24 thus extend in the direction of extension of the traverse 20 on the one hand and in the direction of movement of the cutting insert holder 12 in the main body 16 on the other hand. One or several grooves, which secure the traverse 20 and thus the cutting insert holder 12 against a rotation, are further provided in the main part 16; these grooves are preferably formed by the notches 24 or the regions receiving the laterally protruding ends of the traverse 20, respectively.

According to an alternative embodiment, the traverse 20 can extend perpendicular to the rotational direction of the main part 16, i.e. parallel to the longitudinal direction of the aperture 30, wherein support elements (e.g. pins), which are preferably secured in the main part 16, protrude into notches provided in the outer circumference of the cutting insert holder 12, into or beyond which, respectively, the ends/end regions of the traverse 20 protrude as well. In the case of this design, compression springs are provided in these notches, which are supported on the support elements and push against the traverse 20 or the ends/end regions thereof, respectively.

A setting device 28 is assigned to the cutting insert holder 12 so as to move the cutting insert holder 12 and thus the cutting element 14 in the direction of movement thereof transversely to the rotational axis of the main part 16 in the guide recess 18. The cutting insert holder 12 has an aperture 30, through which the setting device 28 is guided loosely, i.e. with play, so that the setting device 28 is arranged in the cutting insert holder 12 transversely to the rotational axis of the main part 16 and transversely to the direction of movement of the cutting insert holder 12. This means that the aperture 30 runs perpendicular to the guide recess 18 on the one hand and perpendicular to the rotational axis of the main part 16 on the other hand. The aperture 30 preferably has a rectangular, in particular a square, cross section. A play (also referred to a clearance) is provided between the setting device 28 (or the setting element 32 thereof, which will be described later, respectively) and the inner wall of the aperture 30 at least in the direction of movement of the cutting insert holder 12, so that the cutting insert holder 12 can be moved in the direction of movement thereof in this play 31 in the guide recess 18.

The setting device 28 has a setting element 32, which is preferably designed as axially moveable threaded sleeve, and a threaded drive comprising a drive spindle 34. The axial movability of the threaded sleeve 32 is understood to be a movability along the longitudinal axis of the aperture 30, i.e. perpendicular to the rotational axis of the main part 16 and perpendicular to the direction of movement of the cutting insert holder 12. The threaded drive preferably further comprises a stationary threaded bushing 36 (also referred to as bearing bushing), which is arranged tightly in the main part 16, i.e. so as to be secured against rotation and immovably, in a notch 38, which, like the aperture 30, extends transversely to the rotational axis of the main part 16 and transversely to the direction of movement of the cutting insert holder 12 and which is open towards the inside of the guide recess 18. To tightly anchor the threaded bushing 36 in the main part 16, the threaded bushing 36 can have a non-annular indentation 37 in its outer circumference, on which a pin 39 pushes, which can be actuated from outside the main part 16 and which is designed in particular as pressing pin. The threaded bushing 36 can also be anchored in the main part 16 in a rotationally and axially fixed manner by means of a press fit, soldering, adhesion or the like.

The notch 38 further receives the end of the drive spindle 34 located in the threaded bushing 36 and preferably an end of the threaded sleeve 32, which optionally protrudes beyond the aperture 30 in the direction of the threaded bushing 36. On the opposite side of the aperture 30, a notch 41 can also be provided, which is oriented towards the notch 38 and which is open towards the inside of the guide recess 18, for receiving an end of the drive spindle 34, which protrudes from the aperture 30, and optionally of an end of the threaded sleeve 32, which protrudes from the aperture and which is supported such that it can be rotated and axially moved.

The drive spindle is preferably designed as differential threaded spindle 34 (also referred to as differential threaded screw) and has a first threaded portion 34a and a second threaded portion 34b. The first threaded portion 34a is screw-connected to a threaded bore, which is not identified in more detail, of the threaded sleeve 32, while the second threaded portion 34b is screw-connected to a threaded bore, which is not identified in more detail, of the threaded bushing 36. The first threaded portion 34a and the second threaded portion 34b have dissimilar thread pitches (leads), but identical thread directions (lead directions). In response to a rotational actuation of the differential speed spindle 34, the threaded sleeve 32 thus moves along the spindle axis, which is not identified in more detail, of the differential threaded spindle 34 by a distance, which corresponds to the difference in pitch of the two threaded portions 34a, 34b of the differential threaded spindle 34. The spindle axis extends perpendicular to the direction of movement of the cutting insert holder 12 and perpendicular to the rotational axis of the main part 16. Due to the pitch difference, the threaded sleeve 34 can be moved very precisely by rotating the differential threaded spindle 34. The thread pitches of the threaded portions 34a, 34b can thus for example be defined in such a way that the threaded sleeve 34 is moved by 0.1 mm per rotation of the differential threaded spindle 34. For a movement of this type, the threaded bushing 36 can in particular have a pitch slope of 5.75°. A lubricant supply 40 is preferably assigned to the setting device 28 or the differential threaded spindle 34 thereof, respectively.

For the rotational actuation, the drive spindle or the differential threaded spindle 34, respectively, is connected on its end, which is spaced apart from the threaded bushing, to an actuating element 42 in a rotationally fixed manner, but so as to be moveable in the axial direction. In the shown exemplary embodiment, the actuating element 42 comprises in particular a scale ring 44 and is rotatably mounted in a corresponding receptacle 46 in the main part 16, preferably via a spring ring 48. This means that the actuating element 42 comprising the scale ring 44 is rotatably mounted in the receptacle 46. The scale ring 44 is preferably arranged in a non-illustrated notch in the actuating element 42. The receptacle 46 is preferably oriented towards the notch 38 for the threaded bushing 36 and towards the notch 41 located opposite thereto for the differential threaded spindle 34 (and optionally the threaded sleeve 32) and preferably transitions into the notch 41. The actuating element 42 thus acts as longitudinal coupling for the drive or differential threaded spindle 34, respectively. The scale ring 44 can have, for example, 10 marks/markings, so that a feeding/setting accuracy of in particular 0.001 mm can be attained in the semidiameter. With the receptacle 46, a user can operate the actuating element 42 or the scale ring 44 thereof, respectively, from outside of the cutting tool 10.

The setting element, which is in particular formed as threaded sleeve 32, has a control slope 50, on which the cutting insert holder 12 is supported. The control slope 50 forms an oblique angle, in particular an acute angle, with the rotational axis of the differential threaded spindle 34. If the differential threaded spindle 34 is now rotated by means of the actuating element 40, the setting element or the threaded sleeve 32, respectively, moves along the rotational axis/spindle axis of the differential threaded spindle 34. The control slope 50 of the setting element 32 thereby also moves along the rotational axis/spindle axis of the differential threaded spindle 34. The cutting insert holder 12, which is supported on the control slope 50, is prevented from a movement along the rotational axis of the differential threaded spindle 34 by means of the positive arrangement of the cutting insert holder 12 in the guide recess 18, and is moved in the guide recess 18 in response to the movement of the control slope 50 along the spindle axis due to its spring-loaded mounting perpendicular thereto and also perpendicular to the rotational axis of the main part 16, so that the cutting element 14 is moved either away from the main part 16 in the radial direction or towards the latter (or, depending on the design, even into it). This radial movement advantageously takes place without rotation of the cutting element 14 or of the cutting insert thereof, respectively, about the rotational axis of the main part 16, so that a precise setting of the cutting element 14 of the cutting insert thereof can be attained.

The cutting insert holder 12 located opposite the control slope 50 and facing away from the cutting element 14 preferably has a setting member 52, which preferably extends in the direction of movement of the cutting insert holder 12 and which is supported on the control slope 50, with its end, which faces away from the cutting element 14 and which is preferably formed as rounded wedge surface 52a. The shown embodiment is characterized by a point contact between the front-side round wedge surface 52a of the setting member and the control slope 50, which ensures a smaller level of contamination and a particularly exact setting of the cutting insert holder 12 in the direction of movement thereof. If the differential threaded spindle 34 is rotated by means of the actuating element 42 and if the control slope 50 thus moves in the perpendicular direction to the direction of movement of the cutting insert holder 12, the setting member 52 and, via the setting member 52, the entire cutting insert holder 12 are moved perpendicular to the rotational axis of the main part 16 and perpendicular to the rotational axis of the differential threaded spindle 34. In the case of the cutting tool 10 according to the invention, the cutting insert holder 12 is held in its position only via the compression springs 26, the interaction of setting member/threaded sleeve 32 or the control slope 50 thereof, respectively, with the setting member 52 and the appearing cutting pressure of the cutting. The compression springs 26 are preferably designed in such a way with regard to their spring force that the traverse 22 does not protrude radially beyond the outer circumference of the main part 16 in any position of the cutting insert holder 12.

The setting member 52 is preferably part of an adjusting device 54, which is provided in addition to the setting device 28 and which in particular serves the purpose of presetting the position of the cutting insert holder 12 in relation to the setting element 32 (in particular the control slope 50 thereof) in response to the production of the cutting tool 10.

For this purpose, an adjusting device 54, via which the cutting insert holder 12 can be set individually in the radial direction of the main part 16 relative to the setting element 32, is assigned to each cutting insert holder 12 of the cutting tool 10 according to the invention in addition to the setting device 28, which serves in particular for the fine setting for example in the range of between 0.2 mm and 0.5 mm.

As mentioned above, the adjusting device 54 comprises the setting member 52, which can preferably be set perpendicular to the rotational axis of the main part 16 and perpendicular to the rotational axis/spindle axis of the drive spindle/differential threaded spindle 34. For this purpose, the setting member 52 is preferably formed as setting screw, in particular as jack screw, which is supported on the control slope 50 of the setting element or of the threaded sleeve 32, respectively, and which can be set in the direction of movement of the cutting insert holder 12. The setting screw 52 is integrated in the cutting insert holder 12 via a threaded bushing 56 (also referred to as adjusting device threaded bushing or adjusting threaded bushing), which is fastened in a rotationally fixed and immovable manner in the cutting insert holder 12 and which also extends in the direction of movement of the cutting insert holder 12. The setting screw 52 can be accessed from outside the main part 16 or the cutting tool 10, respectively, through the cutting element-side end of the threaded bushing 56, in particular by means of a non-illustrated setting key, which can be provided with a scale. By rotating the setting screw 52 and thus by moving the setting member 52 in the direction of movement of the cutting insert holder 12, the position of the cutting insert holder 12 relative to the setting element 32 and thus the machining diameter of the cutting tool 10 in particular in response to the presetting can be set or can later also be changed. By rotating the setting screw 52, which is supported on the control slope 50, the cutting insert holder 12 is moved in its direction of movement inside the guide recess 18. The design of cutting insert holder 12 and setting member/setting screw 52 is in particular such that a change of the machining diameter of up to 4 mm is possible.

The threaded bushing 56 of the adjusting device 54 is preferably embodied so as to be slotted, i.e. slotted into different segments (segment-slotted or wall segment-slotted, respectively), wherein a threaded pin 58 is provided, via which the thread play of the threaded bushing 56 can be set in such a way that no interfering thread play is present, but that an actuation/setting of the setting member/of the setting screw 52 is still possible.

The threaded bushing 56 preferably has a U-shaped slot, which is not identified in more detail and which penetrates the threaded bushing wall and through which a wall segment is formed in the threaded bushing 56, which extends in the axial direction of the threaded bushing 56 and which is connected via a material joint to the remaining threaded bushing wall in such a way that it can be deformed elastically, in particular to the inside, in the radial direction of the threaded bushing. On its setting device-side end, the threaded bushing 56 has a flange 57, which abuts against a stop of the cutting insert holder 12, which is not identified in more detail.

Laterally of the threaded bushing 56, the threaded pin is mounted in the cutting insert holder 12 so as to extend parallel to the rotational axis of the drive spindle/differential threaded spindle 34 in a through recess 60, which extends parallel to the aperture 30 and can be moved in its longitudinal direction. The through recess 60 is open on the outer circumference of the cutting insert holder 12, so that the threaded pin 58 can be accessed, for example by means of a corresponding setting key in particular prior to inserting the cutting insert holder 12 into the guide recess 18, and the thread play of the threaded bushing 56 can be set by means of said threaded pin. The setting screw 52 can be secured after setting the thread play by means of the threaded pin 58 and after presetting/adjusting the position of the cutting insert holder 12 with respect to the setting element 32 in the direction of movement of the cutting insert holder 12 by means of the setting screw 52.

Figure 4:
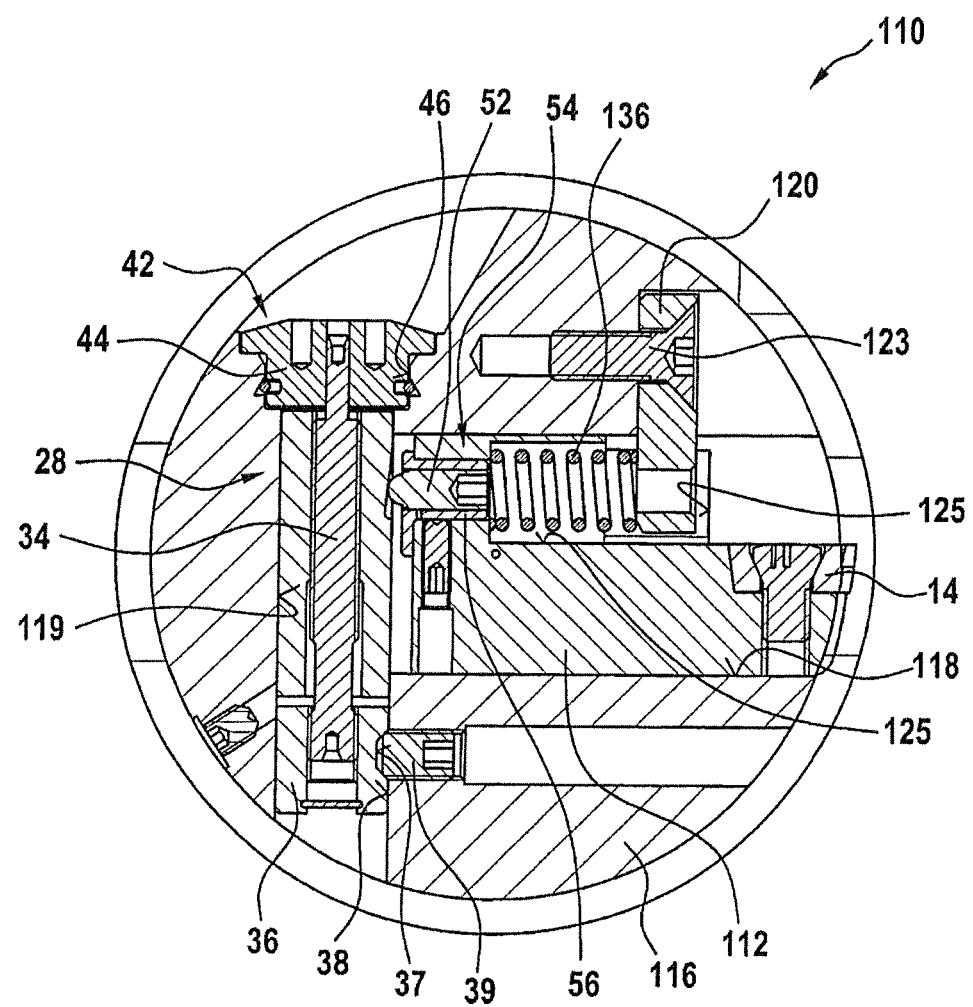
FIG. 4 shows a cross section of a cutting tool according to a second embodiment of the invention.
Figure 5:
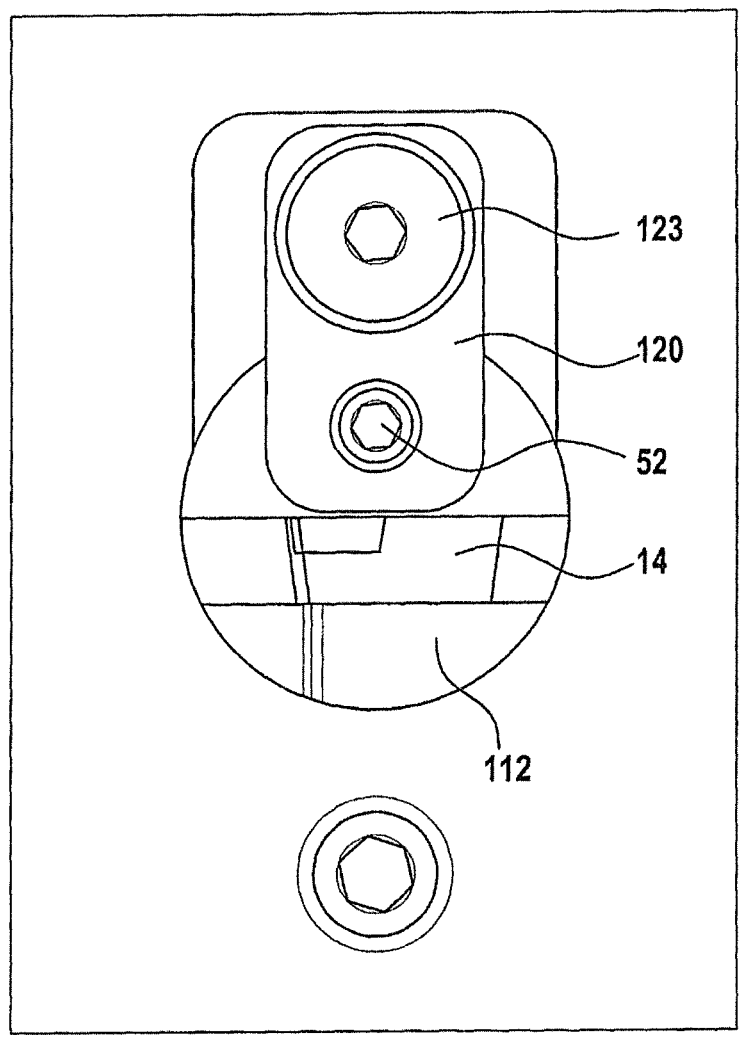
FIG. 5 shows a side view of a portion of the second embodiment of the invention shown in FIG. 4, which comprises a cutting insert holder comprising adjusting device.

FIGS. 4 and 5 show a second embodiment of a cutting tool 110 according to the invention, in the case of which the guide recess, in which the cutting insert holder 112 can be moved perpendicular to the rotational axis of the main part 116 and perpendicular to the rotational axis or longitudinal axis, respectively, of the setting device 28, is formed as ground recess 118, i.e. as recess comprising a ground/bottom 119. The cutting insert holder 112 is preferably supported in the ground recess 119 in a positive and rotationally fixed manner, but so as to be axially moveable. The setting device 28 comprising the setting element 32 and the actuating element 42 assigned thereto essentially correspond to those of the first embodiment shown in FIGS. 1-3, to the description of which reference is made. The same applies for the adjusting device 54 comprising the setting member 52, the cutting element 14, and the lubricant supply 40.

In the case of the embodiment of the cutting tool 110 according to the invention illustrated in FIGS. 4 and 5, the setting device 28 is arranged at or on the bottom 119 of the ground recess 118, so that the setting device 28 and thus also the setting element 32 thereof are arranged between the bottom 119 and the cutting insert holder 112, viewed in the direction of movement of the cutting insert holder 112. According to the first embodiment, a receptacle for rotatably receiving the actuating element 42 is provided in the main part 116 in the longitudinal direction/direction of the rotational axis of the setting device 28 or of the drive spindle 34 thereof, respectively, on the one hand, and a notch 38 for fastening the stationary threaded bushing 36 is provided in the main part 116 on the other side of the ground recess 118 on the other hand, wherein the receptacle 46 and the notch 38 are set with one another. If necessary, a notch 41 for the drive or threaded spindle 34, respectively, and optionally the threaded sleeve 32 can be provided in the main part 116 between the receptacle 46 and the cutting insert holder 112 in the direction of the rotational axis of the setting device 28, which is oriented towards the receptacle 46 and the notch 38 and into which the receptacle 46 preferably transitions.

This means that in the case of the embodiment shown in FIGS. 4 and 5, the cutting insert holder 112 is not formed on both sides of the setting device 28 or of the setting element 32, respectively, in the direction of movement of the cutting insert holder 112 as in the case of the first embodiment, but only on one side. In the case of the second embodiment, the cutting insert holder 112 is also mounted elastically, preferably resiliently. For this purpose, a traverse 120, which is fastened/secured, in particular loosely, to the main part 116, is mounted in a receptacle 125, which is open towards the main part 116 and towards the ground recess wall, so that the cutting insert holder 112 can be moved in its direction of movement relative to the traverse 120, which is fastened to the main part 116, but cannot be rotated about the direction of movement thereof or the longitudinal axis thereof, respectively. The traverse 120 thus forms an anti-rotation protection for the cutting insert holder 112. The receptacle 125 preferably transitions into the receptacle, which is not identified in more detail, for the threaded bushing 56 of the adjusting device 54, so that the setting member or the setting screw 52, respectively, of the adjusting device 54 can be set via the receptacle 125, wherein the diameter of the receptacle 125 (or the expansion thereof in the longitudinal section, respectively) is preferably larger than the diameter of the receptacle for the threaded bushing 56. The traverse 120 preferably extends into the main part 116 perpendicular to the direction of movement of the cutting insert holder 112 in the longitudinal direction of the setting device 28. The traverse 120 is secured via a screw 123, which can preferably be actuated from outside the main part 116, and is fastened to the main part 116.

At least one compression spring 136, preferably in the form of a helical spring, on which the traverse 120 is supported on its side facing away from the cutting element, is preferably arranged in the receptacle 125. The traverse 120 is preferably fastened to the compression spring 136. Due to the compression spring 136, which is preferably formed as helical spring, the setting member 52 of the adjusting device 54 can further be accessed. Via the compression spring 136, the cutting insert holder 112 is mounted in a spring-loaded manner on the traverse 120, namely in a spring-loaded manner in the direction of movement of the cutting insert holder 112.

The traverse 123 and likewise the receptacle 125 thereof preferably also extend along the rotational axis of the main part 116, namely preferably on both sides of the adjusting device 54, wherein the expansion of the receptacle 125 in the direction of the rotational axis of the main part 116 is larger than the expansion of the threaded bushing 56 in the same direction. Viewed from the traverse 120, non-illustrated compression springs, which are fastened to opposite ends or end regions respectively, of the traverse 120 and which are supported on the bottom of the receptacle 125 surrounding the threaded bushing 36, can be provided in this case on both sides of the adjusting device 54 or of the threaded bushing thereof 56, respectively. The cutting insert holder 112 and thus the ground recess 118 can be formed to be rectangular, in particular square, in particular in order to provide the installation for these, preferably two, compression springs. The latter also applies for the cutting insert holder 112 and the through recess 18 of the first embodiment.

Figure 6:
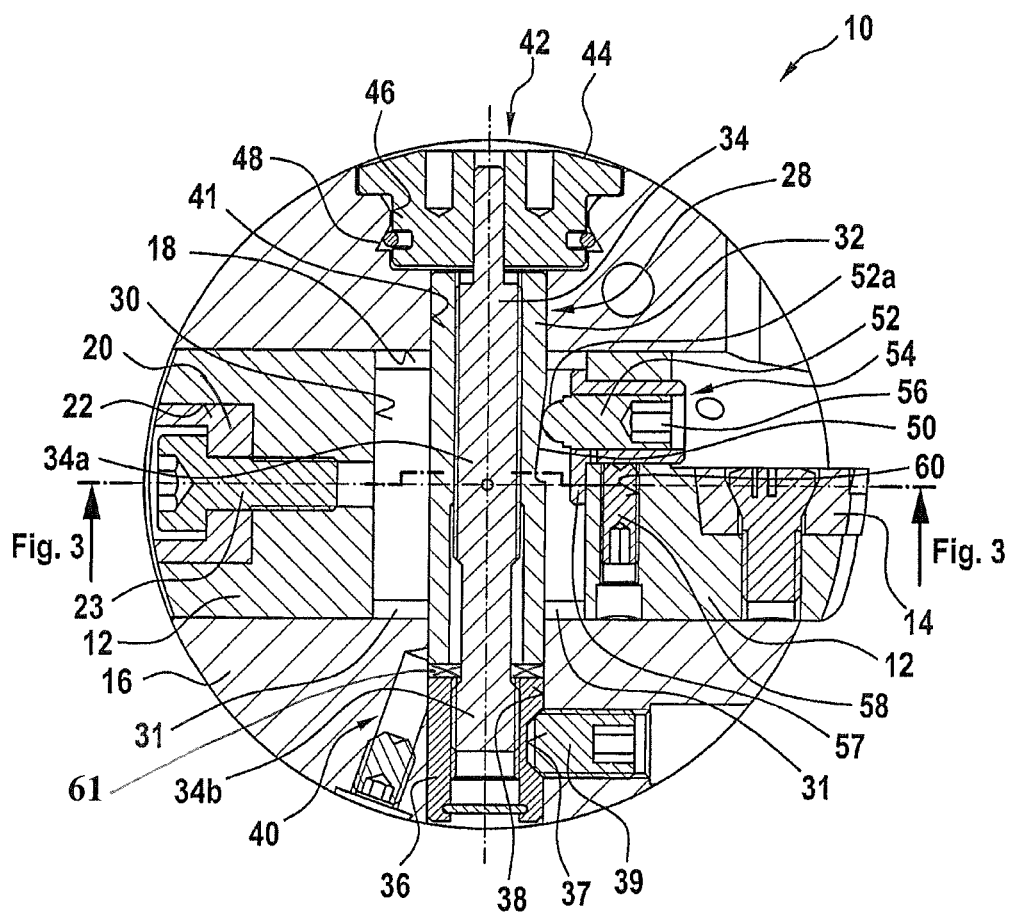
FIG. 6 shows a cross-section of a cutting tool according to a third embodiment of the invention.

FIG. 6 schematically depicts a third embodiment of the present invention, which is similar to the first embodiment as depicted in FIG. 2, except that the third embodiment further comprises a compression spring between the setting element 32 and the threaded bushing 36.

Apart from a machining of a bearing tunnel, the cutting tool according to the invention can be used for any finishing or fine machining of a bore to a predetermined nominal diameter. The cutting tool according to the invention can thus also be used for machining a piston bore in a cylinder crankcase or the like. It may be sufficient in this case, when the cutting tool only has a single cutting insert holder 12, 112.

In the case of the shown embodiment, as it is illustrated in particular in FIG. 1, several cutting insert holders or cutting elements, respectively, are further arranged at predetermined axial distances along the main part of the cutting tool in a row. However, the arrangement in a row is not mandatory. The cutting insert holders arranged at the predetermined axial distances can be arranged offset from one another in the circumferential direction, for example helically, wherein setting devices or setting elements, respectively, which are assigned to the respective cutting insert holders, are then oriented/arranged perpendicular to the direction of movement of the cutting insert holder assigned to them. Due to the arrangement, which is offset in the circumferential direction, the axial distances between the cutting insert holders can be further shortened, depending on the field of application of the cutting tool, and even more cutting insert holders can be arranged on the main part. The arrangement, which is offset in the circumferential direction, thus offers a larger design flexibility.

The invention claimed is:

1. A cutting tool comprising a main part, which is capable of being rotationally driven about a first axis, at least a first cutting insert holder arranged on the main part, a setting element, a threaded drive spindle, and a setting member,
   the first cutting insert holder is arranged in a guide hole in the main part such that the first cutting insert holder is capable of being moved along a second axis, transversely to the first axis,
   the setting element is positioned inside the main part and is capable of being moved along a third axis transversely to the first axis and transversely to the second axis,
   the threaded drive spindle is threaded with the setting element such that rotating the threaded drive spindle about the third axis causes the setting element to move along the third axis,
   the setting element comprises a control slope,
   the setting member is in point contact with the control slope,
   the setting member is threaded with the first cutting insert holder so that upon rotating the setting member about a fourth axis, the fourth axis parallel to the second axis, the setting member is moved relative to the first cutting insert holder along the fourth axis, which causes the first cutting insert holder to move along the second axis,
   movement of the setting element along the third axis results in the control slope causing the setting member to move along the fourth axis, which causes the first cutting insert holder to move along the second axis,
   wherein the first cutting insert holder has an aperture with side walls that extend completely around the setting element in a plane perpendicular to the third axis, the setting element and the threaded drive spindle extend completely through the aperture in the first cutting insert holder, and play is provided between the setting element and the side walls of the aperture in two opposing directions parallel to the second axis.

2. The cutting tool according to claim 1, wherein the first cutting insert holder is received in the guide hole, and the first cutting insert holder is prevented from rotating relative to the guide hole.

3. The cutting tool according to claim 1, wherein the guide hole is a through-hole.

4. The cutting tool according to claim 1, wherein the first cutting insert holder is supported elastically in relation to the main part.

5. The cutting tool according to claim 1, wherein the threaded drive has a threaded bushing, which is secured in the main part at a distance from the setting element, and
   the threaded drive is formed as a differential threaded spindle, which is screw-connected with a first threaded portion to the setting element and with a second threaded portion to the threaded bushing.

6. The cutting tool according to claim 5, wherein a compression spring is arranged between the setting element and the threaded bushing.

7. The cutting tool according to claim 5, wherein the cutting tool further comprises an actuating element, which is held on the main part such that the actuating element is capable of being rotationally moved relative to the main part, and the actuating element is connected to the differential threaded spindle in a rotationally fixed manner.

8. The cutting tool according to claim 1, wherein:
the cutting tool comprises a plurality of cutting insert holders, including the first cutting insert holder,
each of the plurality of cutting insert holders is arranged in a respective guide hole in the main part such that each of the plurality of cutting insert holders is capable of being moved transversely to the first axis, and
each of the plurality of cutting insert holders is supported on a respective setting member.

9. The cutting tool according to claim 8, wherein each of the plurality of cutting insert holders is capable of being set individually.

10. The cutting tool according to claim 1, wherein:
the cutting tool comprises a plurality of cutting insert holders including the first cutting insert holder, and
the cutting insert holders are capable of being arranged at different distances to the first axis.

11. The cutting tool according to claim 4, wherein the first cutting insert holder is supported in a spring-loaded manner in relation to the main part.

12. The cutting tool according to claim 1, wherein a first end of the setting member is rounded.

13. The cutting tool according to claim 1, wherein: the cutting tool further comprises a threaded pin, the threaded pin is threaded in the first cutting insert holder, and the threaded pin is capable of being threaded in the first cutting insert holder to a position where it prevents the setting member from moving.

* * * * *